United States Patent Office 2,828,268
Patented Mar. 25, 1958

2,828,268
PROCESS AND COMPOSITION FOR BREAKING PETROLEUM EMULSIONS

Hans Stanger and Heinz Lemme, Ludwigshafen (Rhine), Germany, assignors to Badische Anilin- & Soda-Fabrik Aktiengesellschaft, Ludwigshafen (Rhine), Germany No Drawing. Application September 7, 1955
Serial No. 533,003

Claims priority, application Germany September 8, 1954

23 Claims. (Cl. 252—336)

This invention relates to the treatment of water-and-oil and brine-and-oil emulsions, particularly petroleum emulsions, for the purpose of separating the oil from the water or brine.

A great number of demulsifying agents have been proposed for breaking petroleum emulsions, among which the salts of sulfocarboxylic acid esters and also the salts of sulfocarboxylic acid amides have been separately suggested. When these particular demulsifying agents are used alone, it is usually necessary to work at temperatures between 60° and 100° C. After 6 to 24 hours, depending upon the stability of the emulsion, a somewhat satisfactory separation of the petroleum emulsion into an oil layer and an aqueous layer is obtained.

We have now found that a surprisingly complete and especially effective breaking or resolving of petroleum emulsions can be achieved by using as the demulsifying agent a synergistic binary mixture of two components including or consisting of (A) a water-soluble salt of a sulfocarboxylic acid ester and (B) a water-soluble salt of a sulfocarboxylic acid amide.

The combination or mixture of the individual demulsifying agents results in a synergistic binary mixture having a very considerably increased effect in the breaking of petroleum emulsions, much more than would be expected through the cumulative effect of each component alone. Smaller amounts of the mixture can be added to the petroleum emulsion than is necessary with the individual components alone. In addition, the mixture will break a petroleum emulsion at lower temperatures and in a shorter time as compared to the individual components alone. The demulsifying effect is also independent of the salt content of the emulsions, even with high contents of salt, e. g. 20%.

One object of the invention is to provide an improved process for breaking petroleum emulsions by subjecting such emulsions to the action of a novel and useful demulsifying composition as will be more fully described hereinafter.

Another object of the invention is to provide a demulsifying composition comprising a synergistic binary mixture of two component demulsifying agents such that the binary mixture is more effective as a demulsifier than either of the components alone.

A further object of the invention is to provide an improved process and composition for breaking or resolving petroleum emulsions in a particularly short time.

Still another object of the invention is to provide an improved process and composition for breaking petroleum emulsions at lower temperatures with greater effectiveness than has been heretofore possible.

A still further and important object of the invention is to provide a process and composition for breaking petroleum emulsions which have a high content of salt whereby the salt as well as the water is effectively separated from the oil.

These and other objects and advantages of the invention will become more apparent from the following description and examples.

The demulsifying compositions employed in the present process for breaking petroleum emulsions are obtained by combining or mixing (A) a water-soluble salt of a sulfocarboxylic acid ester with (B) a water-soluble salt of a sulfocarboxylic acid amide. The most effective results have been obtained with the esters of component (A) formed from an aliphatic or cyclo-aliphatic alcohol having about 7 to 10 carbon atoms in the molecule. The salt of component (B) is preferably derived from an aliphatic or cyclo-aliphatic sulfocarboxylic acid amide in which the nitrogen atom is substituted by one or preferably two aliphatic or cyclo-aliphatic hydrocarbon radicals. The salts of both components are, for example, such water-soluble salts as can be derived by reacting sulfocarboxylic acid esters and sulfocarboxylic acid amides with alkali metals, or with ammonia or its lower molecular weight aliphatic-substituted derivatives. The proportion of component (A) to component (B) can vary within wide limits, e. g. 1:9 to 9:1, depending upon the particular emulsion to be treated, but a mixing ratio of about 1:1 has the greatest general application, the preferred range being a ratio of about 2:3 to 3:2.

Component (A) of the novel mixture can be generally described as the water-soluble salt of a sulfocarboxylic acid ester. Suitable carboxylic acids as initial materials include saturated aliphatic and cyclo-aliphatic monocarboxylic and polycarboxylic acids, also aromatic and aralkyl carboxylic acids which, after conversion by sulfonation into the corresponding sulfocarboxylic acid, can be reacted with a suitable alcohol to form the corresponding sulfocarboxylic acid ester. Examples of suitable initial materials are malonic acid, succinic acid, phthalic acid, hexahydro phthalic acid, benzoic acid, hexahydro benzoic acid, toluic acid, hexahydro toluic acid. It is likewise possible to use unsaturated aliphatic monocarboxylic and polycarboxylic acids as initial materials, the esters of these acids being readily converted to the corresponding sulfocarboxylic acid ester by reaction with a sulfite or bisulfite. Examples of such acids are acrylic acid, methacrylic acid, crotonic acid, maleic acid, fumaric acid, butadiene dicarboxylic acid. The methods by which a sulfonic acid radical can be introduced into a carboxylic acid or carboxylic acid ester to produce the corresponding sulfocarboxylic acid bodies are well known in the art.

Whether the initial acid is a monocarboxylic or polycarboxylic acid, the term "ester" will be used herein to refer broadly to a sulfocarboxylic acid body in which one or more of the carboxyl hydrogen atoms are replaced by a radical derived from an alkyl, aryl, cyclic, hydroaromatic, or aralkyl alcohol, or the like.

The term "salt" will be employed herein primarily to refer broadly to water-soluble salts obtained by the neutralization of the sulfonic acid radical by an alkali metal, or by ammonia or its lower molecular weight aliphatic-substituted derivatives. However, this definition does not exclude the additional neutralization of the carboxyl radicals which are not used in the esterification of polycarboxylic acids.

The sulfo dicarboxylic acids are especially useful, among which sulfosuccinic acid is most advantageous because of its availability and inexpensiveness, and can be prepared, for example, by the reaction of fumaric or maleic acid with a bisulfite. It is preferable to subject an ester of fumaric or maleic acid to a bisulfite reaction rather than first producing sulfosuccinic acid and then forming the ester.

Fumaric or maleic acid can be esterified with any one of a number of alcohols or combinations of alcohols, including the following: mono-hydric alcohols, such as propyl alcohol, butyl alcohol, amyl alcohol, hexyl alcohol, octyl alcohol, decyl alcohol, duodecyl alcohol, stearyl alcohol; unsaturated mono-basic alcohols, such as oleyl alcohol; polyhydric alcohols, such as glycols, ethylene glycol, for example, glycerol, polyglycerols, etc.; ether alcohols, such as di-ethylene glycol butyl ether, etc.; polyhydric alcohols having at least one remaining free hydroxyl, in which one or more hydroxyl has been previously reacted with a suitable acid, such as monoricinolein, di-ricinolein, mono-stearin, mono-olein, or the equivalent bodies derived from polyglycerols; acid alcohols, such as hydroxy stearic acid, ricinoleic acid, polyricinoleic acid, tri-ricinolein, etc.; polyhydric alcohols, in which one or more di-basic carboxy acid residues have been introduced, such as a phthalic acid residue, a maleic acid residue, an oxalic acid residue, etc. (such polyhydric alcohol bodies may be employed, providing a free hydroxyl remains); cyclo-alcohols, such as cyclo-butanol, etc.; aromatic alcohols, such as phenol, cresol, xylenol, naphthol, etc.; aralkyl alcohols, such as benzyl alcohol; heterocyclic alcohols, such as furfuryl alcohol, etc.; mixed isomer forms of the various alcohols, such as mixed amyl alcohols, etc. The fumaric or maleic acid ester is then subjected to a bisulfite reaction to produce the corresponding sulfosuccinic acid ester which, in turn, is neutralized to obtain the water-soluble salt.

Among the water-soluble salts of sulfosuccinic acid esters are included those compounds disclosed in U. S. Patent No. 2,072,085, their preparation being the subject matter of U. S. Patent No. 2,028,091. Other compounds suitable for use in the practice of this invention as component (A) are those disclosed in U. S. Patent No. 2,026,219 in the form of their ester salts. The compounds of the latter patent include the sulfite and bisulfite addition products of a fatty acid ester. The disclosures of the above identified patents are incorporated herein by reference as fully as if they had been set forth in their entirety in order to avoid undue repetition.

The preferred esters of the present invention are those formed from aliphatic or cyclo-aliphatic alcohols which contain 7 to 10 carbon atoms in the molecule, and which can be of natural or synthetic origin, saturated or unsaturated, and among which the branched chain alcohols are particularly useful. For example, such aliphatic alcohols would include methyl cyclohexanol, ethyl cyclohexanol, dimethyl cyclohexanol, heptanol, octanol, nonanol, decanol. The said aliphatic alcohols can be of the branched or straight-chain type and be saturated or unsaturated.

The cyclo-aliphatic alcohols, which are especially advantageous, can be obtained by the hydrogenation of hydro-aromatic alcohols, particularly those which are substituted by one or more methyl or ethyl groups. For example, commercial cresol or xylenol mixtures can be hydrogenated to obtain methyl-, dimethyl-, or ethyl-cyclohexanol. Mixtures of the various alcohols can also be used in the esterification of the carboxylic acids.

Component (B) can be generally described as a water-soluble salt of a sulfocarboxylic acid amide. In general, the carboxylic acids to be used as initial materials for the preparation of component (B) are the saturated aliphatic, cyclo-aliphatic as well as the aralkyl or aromatic acids employed in the preparation of component (A). The term "amide" is employed herein to broadly refer to a sulfocarboxylic acid body, in which the hydroxyl group or groups in any one or more carboxyl groups are replaced by a radical derived from ammonia, or an alkyl, aryl, cyclic, or aralkyl primary or secondary amine, or the like.

It is preferable to employ those carboxylic acids as initial materials which can easily be converted into sulfocarboxylic acid amides. Since amines will react with unsaturated carboxylic acids not only with amide formation, but also in the double linkage of the carbon atoms, use is made of saturated monocarboxylic aliphatic or cyclo-aliphatic carboxylic acids, especially those having from 2 to 8 carbon atoms in a straight or branched chain. Thus, for example, chlorosuccinic acid can be converted into the amide which in turn can be converted into the sulfonic acid with bisulfite. Especially useful for the preparation of the amide are the aliphatic halo-carboxylic acid halides in which the acyl halogen atom can be replaced by an amine, and the aliphatically-combined halogen atom can be replaced by bisulfite to give the corresponding sulfocarboxylic acid amide. Examples of halo-carboxylic acid halides which are advantageous as initial materials are chloro-acetyl chloride, alpha- or beta-chloropropionic acid chloride, the chlorobutyric, chlorovaleric and chloro-α,α-diethyl propionic acid chlorides.

In general, the lower molecular weight sulfocarboxylic acids are preferred in the practice of the invention because of their greater availability and include, for example, sulfoacetic acid, alpha- or beta-sulfopropionic acid, alpha- of beta-sulfoisobutyric acid, sulfo-valeric acid, sulfo-isovaleric acid and beta-sulfo-alpha, alpha-diethylpropionic acid.

The amide is obtained from these carboxylic acids by reaction with ammonia or with a primary or secondary amine. The hydrocarbon substituents of the primary or secondary amine can generally be substituted or unsubstituted, saturated or unsaturated. Secondary amines are preferred, especially those in which the nitrogen atom is substituted by two aliphatic or cyclo-aliphatic hydrocarbon radicals, and more preferably where the hydrocarbon radical has a branched chain, particularly radicals containing from 6 to 10 carbon atoms. Secondary amines which have two branched substituents are, for example, 2-ethylhexyl-butylamine, di-(2-ethylhexyl)-amine, di-(3-ethylheptyl)-amine, di-(3-methylcyclohexyl)-amine, 2-ethylhexyl-3-ethylheptylamine and di-isooctylamine.

The salts of components (A) and (B) should be water-soluble to prevent precipitation of the acid esters and acid-amides. The water-soluble salts can be formed from the corresponding sulfocarboxylic acid esters and sulfocarboxylic acid amides by reaction of the sulfonic acid radical with an alkali metal, ammonia, or the lower molecular weight aliphatic-substituted derivatives of ammonia such as ethylamine, propylamine, or ethanolamine. These amines, which combine with an ordinary inorganic acid to form salts usually comparable to the alkali salts, can be included as equivalents, and for this purpose such salts are defined as "alkali salts."

The two components (A) and (B) are mixed together, preferably in the form of an aqueous solution, to provide a single synergistic binary mixture for an improved breaking of petroleum emulsions. Other suitable carriers are alcohols, benzene, toluene, petroleum and mixtures thereof. It is also possible to use the components (A) and (B) in admixture with one another in the absence of a carrier. The mixtures containing the synergistic compounds are preferably characterized as a demulsifying agent including as two components: (A) an emulsion breaking water-soluble salt of a sulfocarboxylic acid ester and (B) an emulsion breaking water-soluble salt of a sulfocarboxylic acid amide. In the use of the two components as a synergistic binary mixture for breaking petroleum emulsions, the proportion of A:B in the mixture can vary over wide limits, for example, from 1:9 to 9:1. The effect of the binary mixture, which is appreciably greater than the sum effect of the single components, is most advantageous when the ratio of A:B is about 1:1 or in the preferred range of 2:3 to 3:2. No hard or fast rule can be given for the ratio for combining the components since it is well known that the properties of petroleum emulsions are quite different depending on their origin. However, one of the most important advantages of this invention is the fact that mixtures used in the preferred range of 2:3 to 3:2 are highly effective in demulsifying petroleum emulsions regardless of their source.

Petroleum emulsions are known to contain varying amounts of salt, especially common salt, resulting in a brine-in-oil emulsion. Emulsion breakers, previously proposed, must often be carefully correlated to the salt content of the water. The synergistic binary mixtures of the present invention, however, have been found to be surprisingly effective with petroleum emulsions regardless of their salt content, even with a salt content as high as 20%. The mixture is, of course, equally effective at a lower salt content, for example, 5% or less.

Another advantage of the invention resides in the fact that a smaller amount of the present mixture is required to be added to the petroleum emulsion to obtain an excellent demulsification than has been possible with previous emulsion breakers. Up to 70% less material of the present invention can be added as compared to the individual demulsifying agents when used alone. Also, the present mixture is effective at lower temperatures, for example, from 40° to 75° C. or higher temperatures, as compared to the usual 60° to 100° C. range found necessary in the prior art. In general, the effectiveness of the present mixture is the same as or better than prior demulsifying agents at temperatures from two-thirds to three-fourths of those employed by the prior art. Also, the time required for separating the water and oil has been found to be appreciably less when using the binary mixture of the present invention.

It is a matter of routine to the worker in the art to find out the quantities in which the mixtures can be most efficiently used in practice. These quantities differ according to their particular use, i. e. depending on whether the mixtures are added to tanks or pipe-lines or used in the centrifuging or electrical process. Other uses are in the ultrasonic process, the rubble filter process and in the high pressure demulsification.

The invention is further illustrated but not restricted by the following examples in which the parts, unless otherwise specified, are parts by weight.

*Example 1*

0.25 part of a mixture of equal parts of the sodium salt of an ester of sulfosuccinic acid and methyl cyclohexanol with the sodium salt of sulfoacetic acid di-iso-octyl amide in the form of a 5% aqueous solution is added at 80° C. to 1000 parts of a North-west German crude petroleum emulsion with a content of 1.9% of water and 0.18% of salts. The mixture is then stirred intensively until a complete homogenization has been achieved and then allowed to stand completely still at 80° to 85° C. After one to two hours a smooth separation of the emulsion into two layers has taken place. The oil layer contains only traces of water and 0.0009% of salt.

When using 0.25 part of each of the individual components of the above mixture by itself, the water content of the oil cannot be reduced below 0.6% and 0.24%, when using the ester and amide salts respectively, even after 24 hours.

*Example 2*

0.6 part of a mixture of the sodium salt of a mixed ester of sulfosuccinic acid and dimethylcyclohexanol and decyl alcohol with an equal amount of the sodium salt of sulfoacetic acid di-iso-octyl amide in the form of a 5% aqueous solution is added at 80° C. to 1000 parts of an Alsace crude petroleum emulsion having a content of 36% of water and 1.5% of salts. The treatment is carried out as described in Example 1. After 24 hours, the oil layer contains only 0.1% of water. In comparison, when the individual ester and amide salt components are used under the same conditions, using 0.6 part of each component alone to 1000 parts of the emulsion, the oil contains a water content of 6.4% and 0.3% respectively.

The invention is hereby claimed as follows:

1. A synergistic mixture for breaking petroleum emulsions comprising (A) the water-soluble salt of a sulfodicarboxylic acid ester and (B) the water-soluble salt of a sulfomonocarboxylic acid amide, said sulfocarboxylic acid having from 2 to 8 carbon atoms in the molecule, the ratio between (A) and (B) being from 1:9 to 9:1 parts by weight.

2. A synergistic mixture for breaking petroleum emulsions comprising (A) an alkali metal salt of the sulfosuccinic acid ester of an alcohol selected from the group consisting of an aliphatic and cyclo-aliphatic alcohols, said alcohols having about 7 to 10 carbon atoms in the molecule and (B) an alkali metal salt of a sulfomonocarboxylic acid amide, said sulfocarboxylic acid having from 2 to 8 carbon atoms in the molecule and the two hydrogen atoms of the amide nitrogen being substituted by hydrocarbon radicals with 6 to 10 carbon atoms, at least one of said radicals being branched, and the ratio between (A) and (B) being from 2:3 to 3:2 parts by weight.

3. A mixture in accordance with claim 1 in which the proportion of (A) to (B) is from 2:3 to 3:2.

4. A mixture in accordance with claim 1 in which the water-soluble salts of components (A) and (B) are formed from a base selected from the group consisting of the alkali metals, ammonia and the lower molecular weight aliphatic-substituted derivatives of ammonia.

5. A mixture in accordance with claim 1 in which component (A) is a water-soluble salt of a sulfosuccinic acid ester.

6. A mixture in accordance with claim 5 wherein the alcohol moiety of the ester is an alkanol having a branch chain of from 7 to 10 carbon atoms.

7. A mixture in accordance with claim 5 wherein the alcohol moiety of the ester is a cyclo-aliphatic alcohol.

8. A mixture in accordance with claim 1 in which the two hydrogen atoms of the amido group of component (B) are substituted by hydrocarbon radicals having from 6 to 10 carbon atoms, at least one of said radicals being branched.

9. A process for breaking petroleum emulsions which comprises subjecting the emulsion to the action of a synergistic binary mixture of (A) the water-soluble salt of a sulfodicarboxylic acid ester and (B) the water-soluble salt of a sulfomonocarboxylic acid amide, said sulfocarboxylic acid having from 2 to 8 carbon atoms in the molecule, the ratio between (A) and (B) being from 1:9 to 9:1 parts by weight.

10. A process in accordance with claim 9 in which the proportion of (A):(B) is from 1:9 to 9:1.

11. A process in accordance with claim 9 in which the proportion of (A):(B) is from 2:3 to 3:2.

12. A process in accordance with claim 9 in which the water-soluble salts of components (A) and (B) are formed from a base selected from the group consisting of alkali metals, ammonia and lower molecular weight aliphatic-substituted derivatives of ammonia.

13. A process in accordance with claim 9 in which component (A) is a water-soluble salt of a sulfo-succinic acid ester.

14. A process in accordance with claim 9 in which the ester of component (A) is formed from an alkanol having a branch chain of from 7 to 10 carbon atoms.

15. A process in accordance with claim 9 in which the ester of component (A) is formed from a cyclo-aliphatic alcohol.

16. A process in accordance with claim 9 in which the two hydrogen atoms of the amido group of component (B) are substituted by hydrocarbon radicals having from 6 to 10 carbon atoms, at least one of said radicals being branched.

17. A process for breaking petroleum emulsions which comprises subjecting the emulsion to the action of a synergistic binary mixture of (A) an alkali metal salt of the sulfosuccinic acid ester of an alcohol selected from the group consisting of an aliphatic and cyclo-aliphatic alcohols, said alcohols having about 7 to 10 carbon atoms in the molecule and (B) an alkali metal salt of a sulfomonocarboxylic acid amide, said sulfocarboxylic acid having from 2 to 8 carbon atoms in the molecule and the two hydrogen atoms of the amide nitrogen being substituted by hydrocarbon radicals with 6 to 10 carbon atoms, at least one of said radicals being branched, and the ratio between (A) and (B) being from 2:3 to 3:2 parts by weight.

18. A process in accordance with claim 17 wherein components (A) and (B) are present in approximately equal proportions by weight.

19. A mixture in accordance with claim 2 wherein components (A) and (B) are present in approximately equal proportions by weight.

20. A synergistic mixture for breaking emulsions comprising equal parts of the sodium salt of an ester of sulfosuccinic acid and methylcyclohexanol with the sodium salt of sulfoacetic acid di-isooctyl amide.

21. A synergistic mixture for breaking emulsions comprising a mixture of equal parts of the sodium salt of a mixed ester of sulfosuccinic acid and di-methylcyclohexanol and decyl alcohol and the sodium salt of sulfoacetic acid di-isooctyl amide.

22. A process for breaking petroleum emulsions which comprises subjecting the emulsions to the action of a binary mixture of equal parts of the sodium salt of an ester of sulfosuccinic acid and methylcyclohexanol with the sodium salt of sulfoacetic acid with di-isooctyl amide.

23. A process for breaking petroleum emulsions which comprises subjecting the emulsion to the action of a binary mixture of equal parts of the sodium salt of a mixed ester of sulfosuccinic acid and dimethylcyclohexanol and decyl alcohol and the sodium salt of sulfoacetic acid di-isooctyl amide.

References Cited in the file of this patent

UNITED STATES PATENTS

| | | |
|---|---|---|
| 2,072,085 | De Groote et al. | Mar. 2, 1937 |
| 2,435,810 | Vitalis | Feb. 10, 1948 |

FOREIGN PATENTS

| | | |
|---|---|---|
| 55,031 | Holland | Aug. 16, 1943 |